United States Patent [19]

Clark, Jr. et al.

[11] Patent Number: 5,272,216
[45] Date of Patent: Dec. 21, 1993

[54] SYSTEM AND METHOD FOR REMOTELY HEATING A POLYMERIC MATERIAL TO A SELECTED TEMPERATURE

[75] Inventors: William G. Clark, Jr., Murrysville Boro; Robert E. Shannon, Penn Township, Westmoreland County; Warren R. Junker, Monroeville, all of Pa.

[73] Assignee: Westinghouse Electric Corp., Pittsburgh, Pa.

[21] Appl. No.: 635,987

[22] Filed: Dec. 28, 1990

[51] Int. Cl.$^5$ ............ C08C 19/04; C08F 8/06; C08J 3/28; H05B 6/64
[52] U.S. Cl. .................... 525/362; 209/11; 209/214; 210/773; 219/10.41; 219/10.53; 219/10.55 M; 219/10.55 R; 525/317; 528/481; 528/503; 585/241
[58] Field of Search .......... 219/10.55 M, 10.41, 219/10.55 R, 10.53; 156/272.2, 272.4, 273.5, 275.5, 275.7, 379.8; 241/23; 209/214, 11; 264/25; 585/241; 210/695, 748, 773, 222; 252/62.52, 600; 525/362; 528/481, 503

[56] References Cited

U.S. PATENT DOCUMENTS

| | | |
|---|---|---|
| 3,420,923 | 1/1969 | Ashworth et al. . |
| 3,427,264 | 2/1969 | Forster et al. . |
| 3,528,867 | 9/1970 | Leatherman et al. ........ 156/272.2 X |
| 3,657,038 | 4/1972 | Lightfoot .................. 156/306.8 X |
| 3,921,333 | 11/1975 | Clendinning et al. . |
| 3,967,990 | 7/1976 | Ryan et al. . |
| 4,003,840 | 1/1977 | Ishino et al. . |
| 4,024,318 | 5/1977 | Forster et al. . |
| 4,053,433 | 10/1977 | Lee . |
| 4,131,064 | 12/1978 | Ryan et al. . |
| 4,197,104 | 4/1980 | Krystyniak et al. . |
| 4,399,226 | 8/1983 | Danielson et al. . |
| 4,406,411 | 9/1983 | Gall et al. .................. 241/23 X |
| 4,421,660 | 12/1983 | Solc . |
| 4,518,031 | 5/1985 | Yamanishi et al. . |
| 4,559,373 | 12/1985 | Guthrie et al. . |
| 4,575,432 | 3/1986 | Lin et al. . |
| 4,581,158 | 4/1986 | Lin . |
| 4,626,642 | 12/1986 | Wang et al. .................. 156/272.4 |
| 4,640,035 | 2/1987 | Kind et al. . |
| 4,762,864 | 8/1988 | Goel et al. . |
| 4,774,265 | 9/1988 | Ugelstad et al. . |

(List continued on next page.)

OTHER PUBLICATIONS

Grant, R., et al., ed., Chemical Dictionary, 5th ed., New York: McGraw-Hill, 1987, pp. 40, 370.

(List continued on next page.)

Primary Examiner—Richard D. Lovering
Attorney, Agent, or Firm—M. P. Lynch

[57] ABSTRACT

Both a system and method are provided for remotely heating a polymeric material to a selected temperature. The system generally comprises particulate ferromagnetic material dispersed throughout the polymeric material to form a composite, wherein the particulate material has a Curie temperature that corresponds to the selected heating temperature, and a source of microwave energy for remotely applying a beam of microwave energy to the polymeric composite material. Preferably, the particulate ferromagnetic material comprises only about 2 percent of the total composite by weight. The polymeric material may be compliant, thermosettable plastic, and the Curie temperature of the particulate ferromagnetic material dispersed therein may advantageously be above the curing temperature of the polymer, such that the beam from the source of microwave energy may be used to remotely join surfaces or construct joints in composite structures. Alternatively, the polymeric material may be a meltable plastic, and the Curie temperature of the particulate ferromagnetic material may be chosen to be above the temperature of fusion of the polymer to create a polymeric composite which is magnetically separable from other polymers within a solid waste facility, and which may be melted down for recycling purposes. In a variation of this embodiment, a heat actuatable degradation chemical may be dispersed through the polymeric material along with the ferro-magnetic material to create a plastic composite which is selectively degradable by the remote application of microwave energy.

27 Claims, 4 Drawing Sheets

U.S. PATENT DOCUMENTS

| | | |
|---|---|---|
| 4,823,113 | 4/1989 | Hasegawa . |
| 4,849,020 | 7/1989 | Osborne et al. . |
| 4,891,404 | 1/1990 | Narayan et al. . |
| 4,914,717 | 4/1990 | Gibbon ........................ 219/10.55 M |
| 4,929,928 | 5/1990 | Hultaker . |
| 4,937,995 | 7/1990 | Deffeyes et al. . |
| 4,940,633 | 7/1990 | Hermansen et al. . |
| 4,944,185 | 7/1990 | Clark, Jr. et al. . |
| 4,969,968 | 11/1990 | Leatherman ................. 219/10.55 M |
| 4,980,670 | 12/1990 | Humphrey et al. . |
| 5,025,128 | 6/1991 | Derbyshire ....................... 156/272.4 |
| 5,064,494 | 11/1991 | Duck et al. ..................... 156/275.5 X |
| 5,072,087 | 12/1991 | Apte et al. .................... 219/10.55 M |
| 5,128,504 | 7/1992 | McGaffigan et al. ....... 156/272.4 X |
| 5,129,977 | 7/1992 | Leatherman ................ 156/275.5 X |

OTHER PUBLICATIONS

Perry, R. H., et al., ed., Chemical Engineer's Handbook, New York: McGraw-Hill, 1973, pp. 21–60.

Readdy, Jr., "Plastics Fabrication by UV, IR, Induction, Dielectric, & Microwave Radiation Methods" Plastec, Dover, N.J., Report R43 pp. 107, 112–4, 1972.

Article entitled "Magnetic Fluids" appearing in the Jul. 1966 issue of International Science and Technology.

Article entitled "Westinghouse's Electromagnetic 'Tags' May Detect Flaws in Buildings, Roads" appearing in *The Wall Street Journal*, Monday, Jun. 12, 1989.

Article entitled "Tagged Materials Speak For Themselves" appearing in *Westinghouse Technology*, winter 1990.

Article entitled "A New Eye on Quality" appearing in the *Pittsburgh Post Gazette* Aug. 28, 1989.

Article entitled "New Tagging Technology Could Mean Better Structures" appearing in *The Construction Specifier* Aug. 1989.

Article entitled "Researchers Embed Tags to Test Materials" appearing in *Civil Engineering* Aug. 1989.

Article entitled "Embedded Iron Dust Reveals Inner Secrets of Concrete" appearing in *Engineering Times* Aug. 1989.

Article Entitled "Tagged Adhesives for Improved Electromagnetic Inspection" By W. G. Clark, Jr., R. K. Sadhir and W. R. Junker published in *Materials Evaluation*/48/Jan. 1990.

Article entitled "Tagging Lets You Test the Untestable" By William G. Clark, Jr. and Robert E. Shannon in *Advanced Materials & Process* Apr. 1990.

SYSTEM AND METHOD FOR REMOTELY HEATING A POLYMERIC MATERIAL TO A SELECTED TEMPERATURE

BACKGROUND OF THE INVENTION

This invention generally relates to systems and methods for remotely heating polymeric materials to selected temperatures by the dispersion of particulate ferromagnetic materials throughout the polymers whose Curie temperatures correspond to the selected temperatures of heating. Both the system and the method find particular application in the remote formation of joints in composite structures, and may be used to form plastic materials which are either recyclable, or separably heat degradable.

Thermosettable plastic materials for forming mechanical joints or other structures are known in the prior art. In their uncured state, such materials may resemble either viscous liquids, putty-like solids, or even flexible, tape-like materials which may be manipulated into a desired shape, and then heat-cured to form a tough plastic solid that assumes the shape that the uncured polymer was last manipulated into. These materials find particular application with respect to the construction of joints in composite structures, such as in the graphite composite frames of state-of-the-art aircraft.

Unfortunately, there are a number of drawbacks associated with the use of such thermosettable polymers to construct aircraft frames and other structures that significantly limits their usefulness. For example, at some stages of construction, it is desirable if not absolutely necessary that the heat used to thermoset the polymer be applied only locally to the specific area of the joint, as the application of such heat to the surrounding components may damage or degrade them. In such instances, the application of heat in the form of infrared radiation must be performed very carefully, and with appropriate shielding so as not to damage the surrounding components. Still other difficulties arise with respect to the inspection of the surrounding joints. As joints formed entirely of plastics and other composite materials are transparent to X-rays, it is not possible to inspect the joint for bubbles, cracks, or other quality-degrading discontinuities with the same kind of X-ray equipment used to inspect metallic joints. Finally, both of these aforementioned problems become exacerbated when it is necessary to perform the repair of a joint formed from such thermosettable, polymeric materials since the remote and focused application of the energy necessary to heat-cure the thermosetting plastic used in the repair becomes difficult, if not impossible, as does the ability to remotely inspect the repaired joint. While these problems might be overcome by the provision of polymeric materials that are remotely heatable to selected temperatures corresponding to the curing temperatures of the polymers, thus far no such polymers have been developed in the prior art.

Still another set of problems which might be solved by provision of selectively and remotely heatable plastic materials occurs in the area of recyclable and degradable plastic materials. Recyclable plastics are known in the prior art. Such plastic materials may be used as wrapping or packaging materials for food products and manufactured goods, and then separated from other solid waste materials after being discarded and finally melted back down into a raw plastic material suitable for reuse. However, the lack of a convenient way to separate such reusable plastics after they are commingled with other unrecyclable polymeric materials and solid wastes has severely limited the usefulness of recyclable plastics. And while degradable plastics are known, these plastics are likewise not easily separable from other plastic materials and solid waste which they may be commingled with upon disposal. Many known degradable plastics further suffer from the disadvantage of being vulnerable to degradation when such degradation is not desirable. Such problems might be solved by the provision of polymeric materials that, even when commingled with other materials, are separately heatable to a temperature corresponding to their fusion temperatures so that they might be melted out and separated from other solid wastes.

Clearly, there is a need for plastic materials which are selectively and remotely heatable to a desired temperature, and which are further relatively easy to separate after being commingled with other polymeric materials and solid wastes.

SUMMARY OF THE INVENTION

Generally speaking, the invention is both a system and method for remotely heating a polymeric material to a selected temperature by means of a directed beam of microwave energy. The system of the invention generally comprises a particulate ferromagnetic material dispersed throughout the polymeric material to form a composite, wherein the particulate material has a Curie temperature that corresponds to the selected heating temperature, and a source of microwave energy for remotely applying microwaves to the polymeric composite. The particulate ferromagnetic material is preferably composed of particles of a spinel ferrite which comprises between about 0.1 percent and 10 percent by weight of the polymeric composite material. Preferably, the diameter of the particles of ferromagnetic material range between about 10 and 1000 Angstroms, and more preferably within a range between about 50 and 150 Angstroms.

The system of the invention may assume the form of a variety of different embodiments, each of which has its own unique advantages over the prior art. For example, the polymeric material may be a thermosettable polymer, and the Curie temperature of the particulate ferromagnetic material may be chosen to be above the thermosetting temperature of the polymer, and the source of microwave energy of the system may be used to selectively cure the composite into solid form. Since the surrounding polymeric materials are unaffected by microwave radiation, only the ferrite-containing composite will be heated by the microwave beam. This particular embodiment of the invention finds application as an adhesive. In the method of this embodiment of the system of the invention, uncured polymeric composite in a semi-liquid form may be applied between two surfaces desired to be joined, and a beam of microwave energy may be selectively focused onto the uncured composite to advantageously join the two surfaces. In a related embodiment of the invention, the Curie temperature of the ferromagnetic particles may be chosen so that they are just above the fusion temperature of the polymeric material, and the polymeric material may be applied between two surfaces desired to be joined and then melted to join these surfaces by the focused application of the beam of microwave energy.

Other embodiments of the system and method of the invention may be used to either recycle or to degrade polymeric materials into harmless composts. For example, the Curie temperature of the ferromagnetic particles may be chosen to be higher than the fusion temperature of the polymeric material, and in the method of this particular embodiment of the invention, the composite polymeric material, if commingled with other polymeric materials in a solid waste facility, may be first magnetically separated from the other polymeric materials, and then melted for reuse by the selective application of a beam of microwave energy to the separated composite. Alternatively, the polymeric composite may be separated from the other polymeric materials which it is commingled with by the application of a sufficient amount of microwave energy to completely melt the composite so that it runs off from the other commingled materials.

In still another embodiment of the system of the invention, a heat actuatable degradation chemical is dispersed throughout the polymeric material along with the ferromagnetic material, and the Curie point of the ferromagnetic material is chosen to be above the actuation temperature of the degradation chemical. In the associated method of the invention, the polymer composite may first be magnetically separated from other polymeric materials with which it is commingled with, and then reduced to a harmless compost by the selective actuation of the degradation chemical by microwave energy.

In all the aforementioned embodiments, the selection of a ferromagnetic material having a Curie temperature which interacts with some property of the surrounding polymeric material to achieve a useful result, in combination with a directable beam of microwave energy that is capable of remotely heating the resulting composite to the Curie temperature of the ferromagnetic particles, advantageously results in an invention that may be used to remotely join or bond together different structural components of a composite structure, or to create a system for separating, recycling, or degrading polymeric materials in a solid waste facility.

BRIEF DESCRIPTION OF THE SEVERAL FIGURES

Figure 3A:
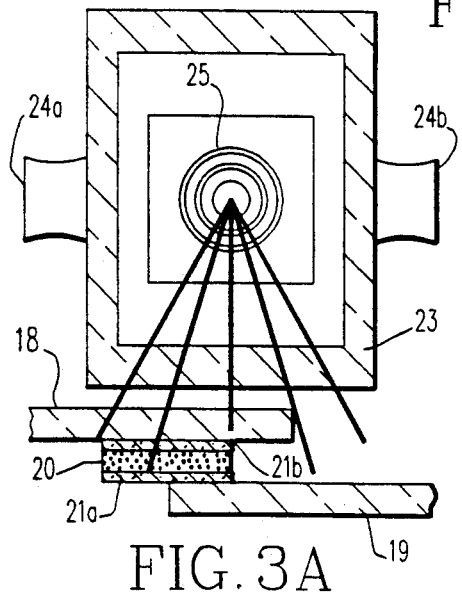
Figure 3B:
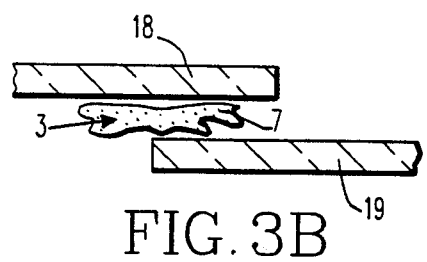
Figure 3C:
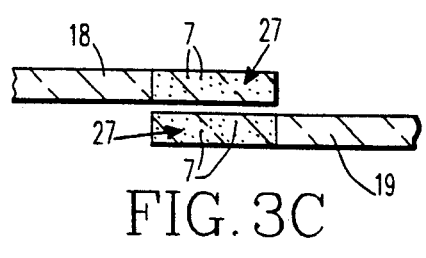
Figure 3D:
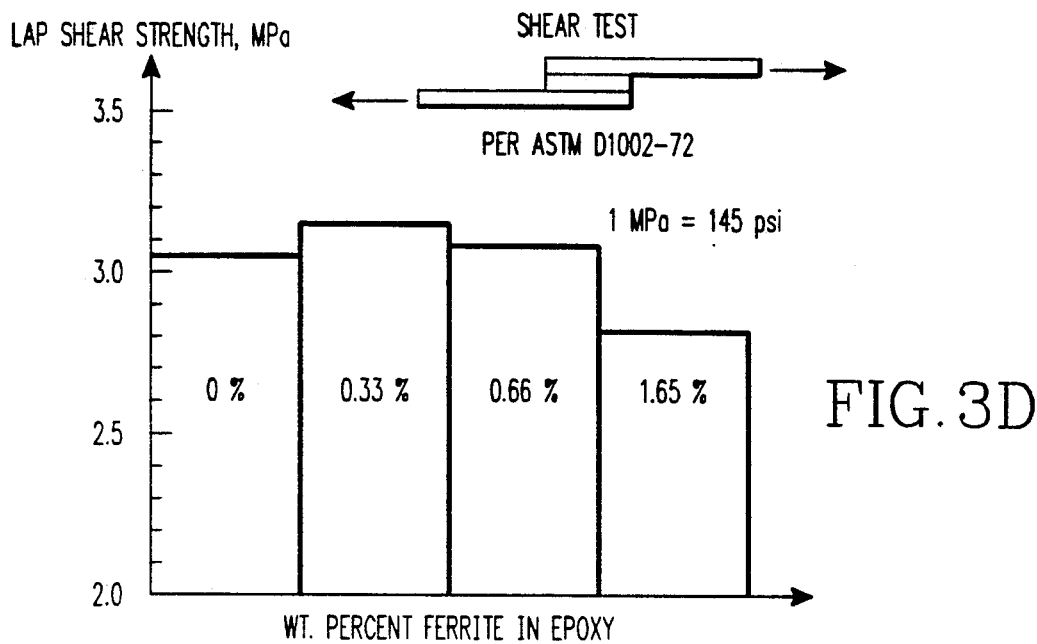
Figures 4, 5:
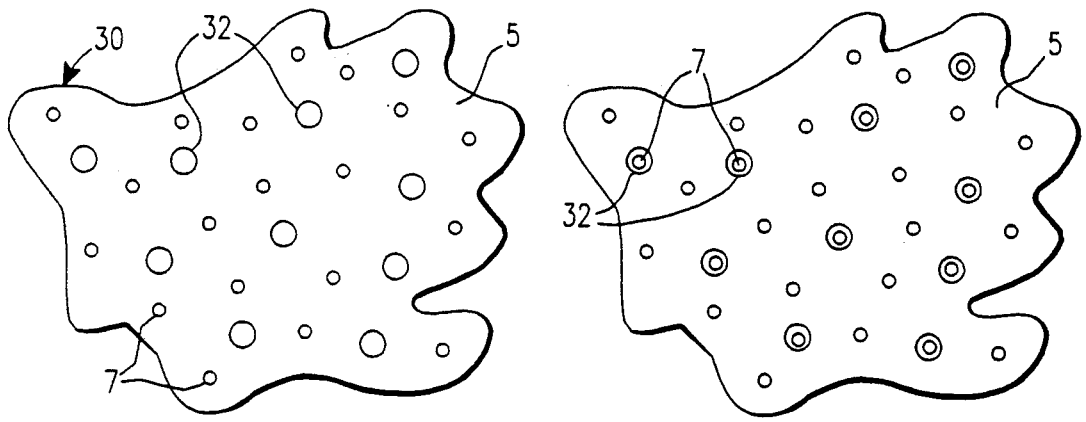
Figure 6:
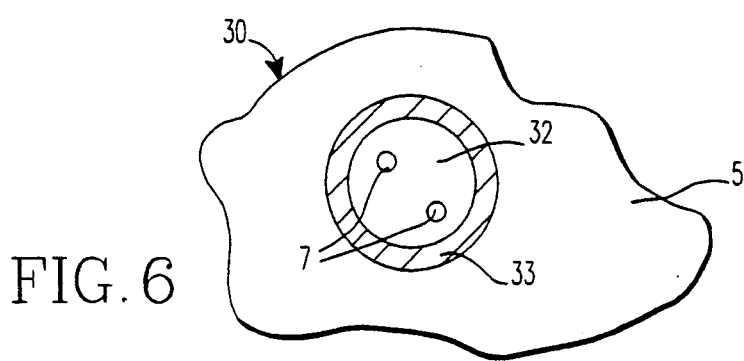
Figure 7:
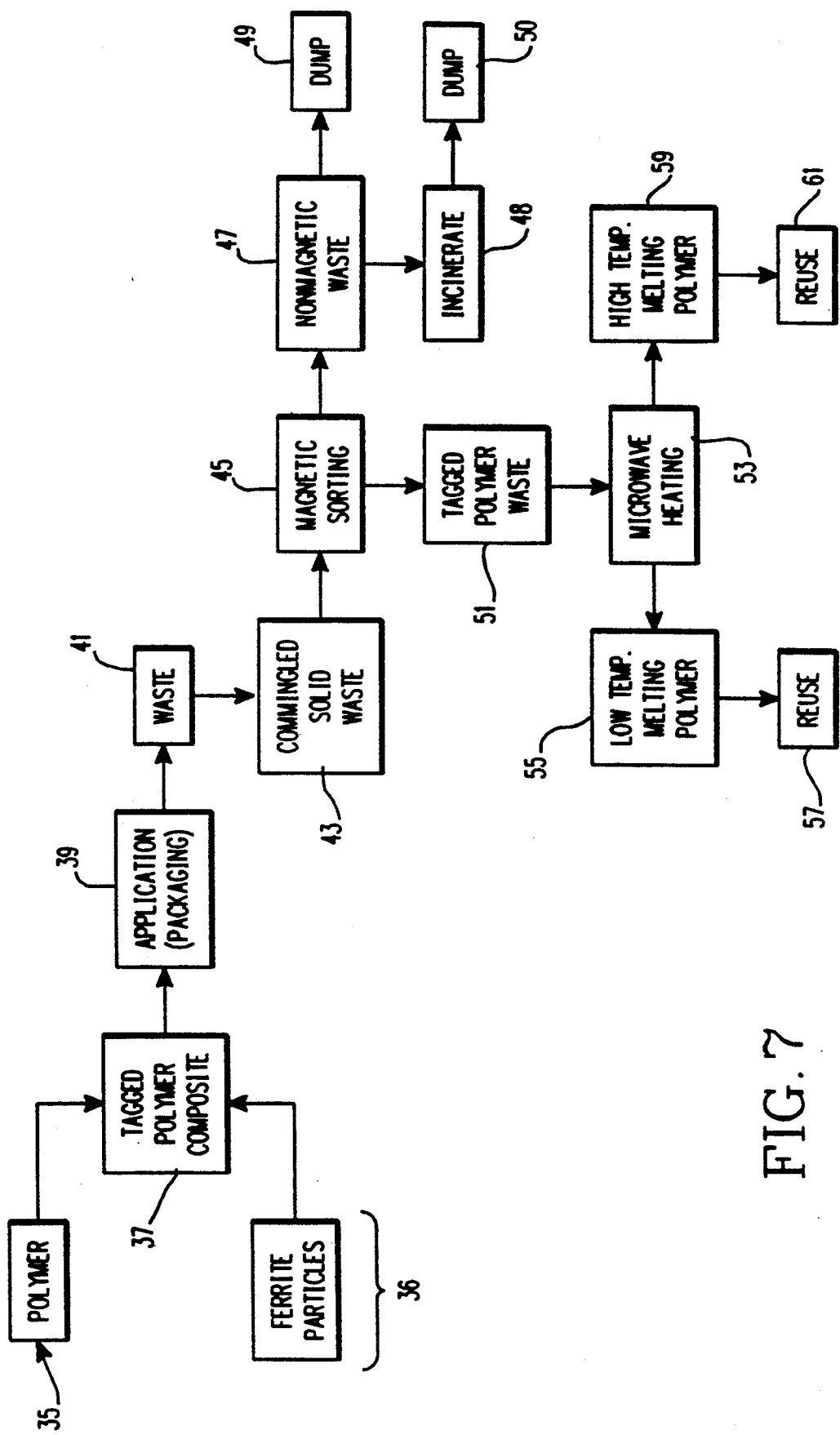
Figure 8:
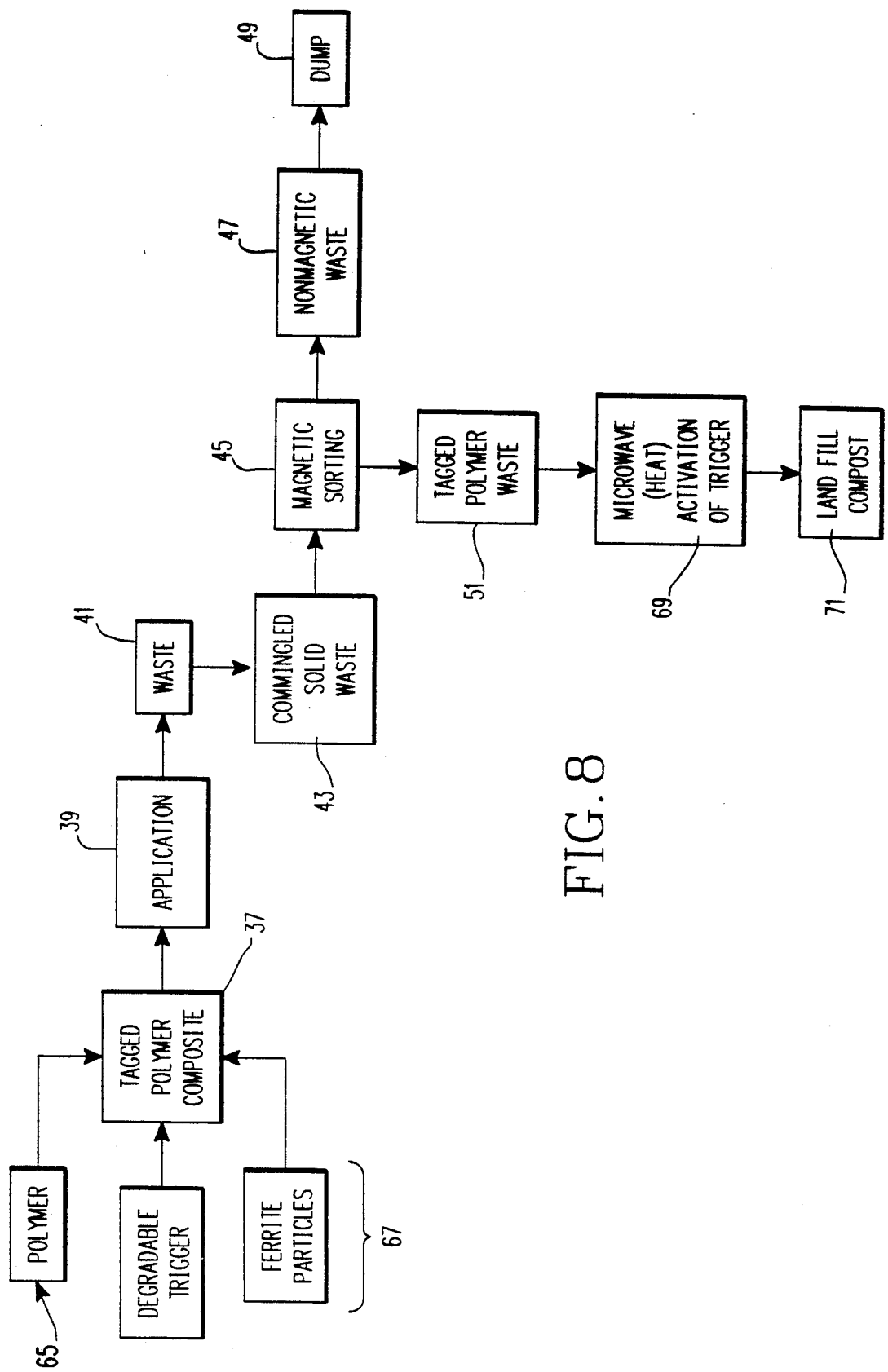

FIG. 3A discloses how the system of the invention may be used to bind together the edges of a pair of microwave-transparent sheet materials, wherein the polymer composite used is a flexible strip of uncured thermoplastic material having particulate ferromagnetic material incorporated therein;

FIG. 3B illustrates a variation of the embodiment of the invention illustrated in FIG. 3A, wherein the polymer composite material takes the form of a putty-like thermoplastic having particulate ferromagnetic material incorporated therein;

FIG. 3C is still another variation of the system of the invention illustrated in FIG. 3A, wherein the edges of the microwave-transparent sheet material are formed from a fusible plastic material, and have particulate ferromagnetic material incorporated therein such that these edges may fuse together and form a bond when exposed to a beam of microwave energy;

FIG. 3D is a graph illustrating how the lap shear strength of an epoxy bonding composite is affected by different concentrations of ferrite particles;

FIG. 4 illustrates a heat degradable composite of the system of the invention, wherein the polymeric composite has particles of a heat actuated degradation chemical distributed through its polymeric matrix along with particles of ferromagnetic material;

FIG. 5 is a variation of the heat degradable composite illustrated in FIG. 4, wherein the ferromagnetic particles are encapsulated within the particles of the heat-actuated degradation chemical, which is in turn uniformly distributed through the polymer matrix of the composite;

FIG. 6 illustrates still another heat degradable composite of the invention, wherein a degradation chemical is encapsulated within a heat-fusible plastic material, along with one or more particles of ferromagnetic material;

FIG. 7 is a flowchart of a plastic recycling method which is within the scope of the instant invention, and FIG. 8 is a flowchart of a plastic degradation method which is also within the scope of the instant invention.

DETAILED DESCRIPTION OF THE PREFERRED EMBODIMENT

Figures 1A, 1B, 1C:
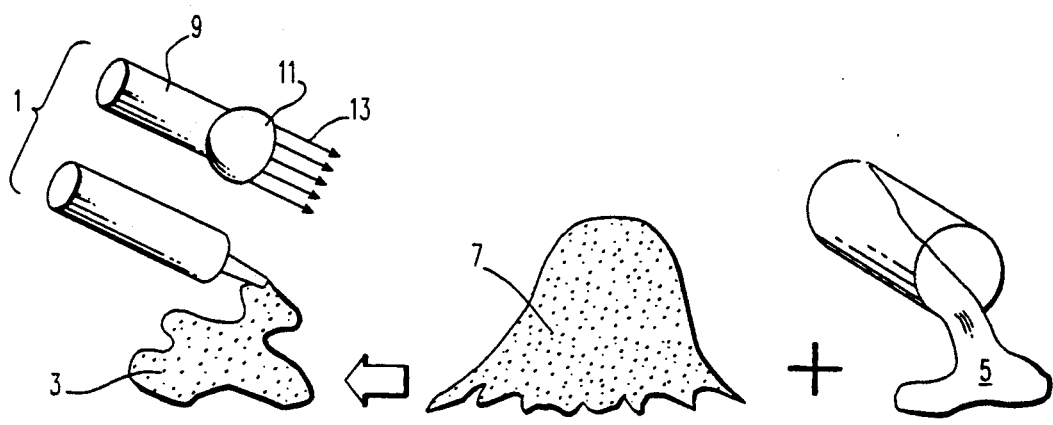
FIG. 1A illustrates the polymeric composite and source of microwave radiation which generally form the system of the invention.
FIG. 1B and 1C represent the particulate ferromagnetic material and the polymeric material which, when mixed together, form the polymeric composite of the system of the invention.

With reference now to FIGS. 1A, 1B, and 1C, system 1 of the invention generally comprises a polymeric composite 3 formed from a polymeric material 5 mixed with a particulate ferromagnetic material 7, and a source 9 of microwave radiation. In the preferred embodiment, the Curie temperature of the particulate ferromagnetic material 7 is chosen so that it has some desired or useful effect upon the matrix of polymeric material 5 within which it is embedded. For example, if the polymeric material 5 is an uncured thermoplastic, the Curie temperature of the ferromagnetic material 7 may be chosen so that it is above the curing temperature of the material 5. Similarly, if one wishes to melt or fuse the polymeric material 5 in the ultimate application of the composite 3, the Curie temperature of the particulate ferromagnetic material 7 is chosen to be above the melting point of the polymeric material 5. In the preferred embodiment, the particulate ferromagnetic material 7 used are fine particles of spinel ferrites whose diameters range between 50 to 500 Angstroms and whose Curie temperatures range between 50° C. to 700° C. The particulate ferromagnetic material 7 may comprise anywhere between 0.1 to 10 percent by weight of the resulting polymeric composite 3, and more preferably comprises between 1 and 2 weight percent of the resulting composite 3. Ferrites are generally the particles of choice for all of the various embodiments of the invention since such particles are characterized by a Curie temperature limit. However, any particulate matter having a Curie temperature that determines the maximum temperature that the particles may be heated to by microwave radiation is within the scope of the invention. By contrast, while many types of metallic particles may be heated by microwave radiation, many such particles are not characterized by a Curie temperature. Hence they can heat up without limit when exposed to microwave radiation. The applicants have found that an excellent source of fine particles of spinel ferrites is present in a waste product of the wood processing industry that is designated as ferromagnetic iron lignosulfonate, and which comprises such fine particulate ferrites (50–0150 Angstroms) colloidally suspended in an aqueous solution. Such lignosulfonate may be obtained from, for example, the Georgia Pacific Corporation located in Bellingham, Washington. While the source of microwave radiation 9 may emit microwaves having a frequency of from anywhere between 400 MHz and 3,000 MHz, microwaves in the upper section of the frequency range are preferred due to the fact that they are easier to direct into a relatively narrow beam. As will be more fully appreciated later, the ability to collimate in focus such microwave energy is a particularly useful feature in the context of this invention, as it allows the system operators to deliberately and remotely apply microwave energy to a particular location where it is desire to heat the composite 3.

Figures 2A, 2B, 2C:
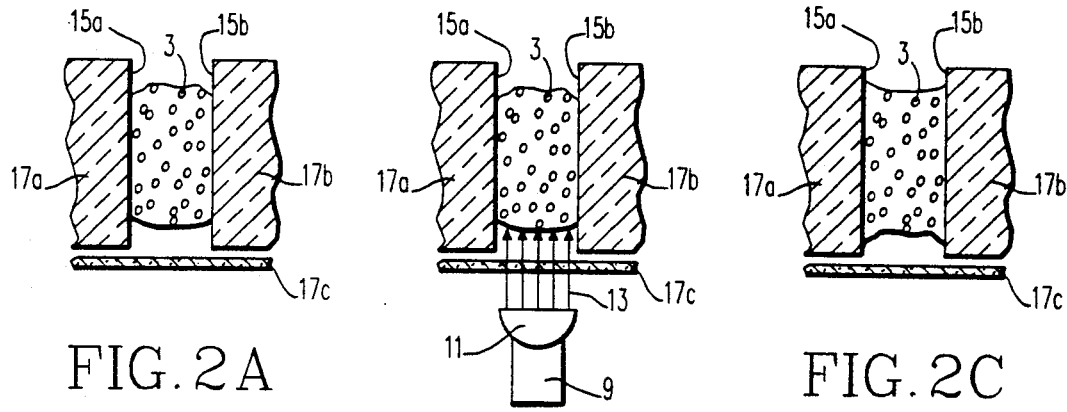
FIG. 2A illustrates how one embodiment of the system of the invention may be used to bind together opposing surfaces of a pair of different structural components wherein the polymeric composite used includes a heat curable thermoplastic.
FIG. 2B illustrates how the heat curable thermoplastic used in the polymeric composite of the invention might be remotely heat cured by the application of a beam of microwave energy.
FIG. 2C illustrates how the resulting, heatcured thermoplastic-containing composite material can form a permanent and secure bond between the opposing surfaces of the two structural components.

FIGS. 2A, 2B and 2C illustrate one embodiment of the system 1 of the invention which may advantageously be used to bind together opposing surfaces 15a,b of a pair of structural components 17a,b. For this purpose, the polymeric material 5 used in the composite 3 is a liquid or putty-like polymer that hardens when exposed to heat. Examples of such thermosetting polymers include epoxies, polyesters, polyurethanes, polybutadienes, cyanate esters, bismaleimides, polyimides, phenolics, alkyds, amino resins, and even silicones. Any such thermosetting plastic material that permanently hardens or "sets" when heated above a selected temperature is included within the scope of this invention. In the application of the invention illustrated in FIGS. 2A, 2B and 2C, a quantity of particulate ferromagnetic materials 7 is intermixed with the thermosetting plastic that forms the polymeric material 5 in order to form a putty-like polymer composite 3. This composite 3 is applied between the surfaces 15a,b to be bonded together. Then, as is illustrated in FIG. 2B, the polymeric composite 3 may be exposed to a collimated beam 13 of microwaves radiated from the reflector 11 of the source 9 of microwave radiation. Such a beam 13 may be easily and conveniently applied even when the polymer composite 3 is disposed behind a panel 17c, so long as the panel 17c is transparent to microwave radiation. After the absorption of the beam 13 of microwave energy by the particulate ferromagnetic material 7 within the composite 3 causes the polymer composite 3 to heat up to the Curie temperature of the ferromagnetic material 7 and to permanently thermoset the composite 3, a permanent joint is created between two structural components 17a,b, as is illustrated in FIG. 2. The directability of the beam 13 of microwaves from the microwave source 9, coupled with the fact that these microwaves easily penetrate through most non-metallic components, confers great utility of this particular embodiment of the system 1 in creating joints or in repairing joints in composite structures (such as the new graphite frames currently being manufactured for some airplanes) as it allows such joints to be created without the application of unwanted heat to large portions of the composite structure being built, and further allows such heat to be selectively and remotely applied to portions of the resulting structure which are either physically inaccessible to the microwave source 9, or covered by microwave-transparent components such as panel 17c.

FIGS. 3A, 3B and 3C illustrate still another embodiment of the invention which may be advantageously used to join together the edges of upper and lower sheet 18,19 of a material that is substantially transparent to microwave radiation. In this embodiment, the polymeric composite 3 assumes the form of a pliant tape or strip 20 that is formed from an uncured, thermosetting plastic that has been mixed with particulate ferromagnetic material 7 in the proportions previously described. This tape or strip form 20 of the uncured polymeric material 5 advantageously includes adhesive layers 21a,b on either or both its upper and lower sides so that it may conveniently be affixed into a proper position between the overlapping sheets 18,19 prior to the bonding operation. After the tape or strip 20 has been affixed by the adhesive layers 21a,b in the position illustrated in FIG. 3A, a roller 23 preferably formed from a microwave transparent material and supported by side bearings 24a,b is applied over the overlapping portions of the upper and lower sheets 18,19 in order to join the same. The roller 23 includes a microwave source 25 that directs a beam of microwave energy which is sufficient in magnitude to bring the particulate ferromagnetic material 7 up to its Curie temperature (which is chosen to be above the thermosetting temperature of the polymeric material 5 used in the composite 3), which in turn causes the composite 3 to harden and to join the upper and lower sheets 18,19.

FIG. 3B illustrates a variation of the embodiment of the invention illustrated in FIG. 3A, the only difference being that the polymeric composite 3 is formed from a putty-like thermosetting plastic that has been impregnated with a particulate ferromagnetic material 7, instead of a thermosetting material 5 which, in its uncured state, forms a pliant tape or strip 20. In the variation of the invention illustrated in FIG. 3B, it is envisioned that the uncured composite 3 might be applied by means of a caulking gun in much the same way that caulking is applied around the windows and rain gutters of modern homes and buildings.

FIG. 3C illustrates still another variation of the invention which may advantageously be used in conjunction with the roller device illustrated in FIG. 3A to form a joint between the overlapping edges of an upper and lower 18,19 sheet of microwave transparent sheet material. However, in this particular variation of the invention, the sheets 18,19 are formed from fusible thermoplastics which, when melted, are capable of hardening into a permanent joint. In this particular variation of the invention, only an edge portion 27 of each of the sheets 18,19 is impregnated with a particulate ferromagnetic material 7 whose Curie temperature is higher than the temperature of fusion of the thermoplastic material from which the upper and lower sheets 18,19 are formed. The edge portions 27 of the sheets 18,19 are overlapped as is illustrated in FIG. 3C, and the roller device 23 illustrated in FIG. 3A is used to fuse a joint between the two sheets 18,19. In this variation of the invention, it should be noted that the provision of the particulate ferromagnetic material 7 in only the edge portions 27 obviates the need for the operator to carefully direct the beam of microwaves from the microwave source 25, as the portions of the sheets 18,19 which are devoid of the particulate ferromagnetic material 7 will not be heated by the accidental application of such microwaves.

FIG. 3D illustrates how the lap shear strength of an epoxy-based polymeric composite is affected by different concentrations of ferrite particles. The data on this graph surprisingly illustrates that the lap strength of an epoxy-based composite can actually increase with a ferrite content of up to 0.66 weight percent. Such a weight percentage of ferrite particles is ample to effect the heat-curing of the composite, and to allow for an eddy current probe inspection of the cured epoxy bond.

Both the system 1 and the method of the invention may also be advantageously used to create recyclable plastic composites. Such a recyclable composite may be formed from a thermoplastic (such as a polyolefin, polyester, liquid crystal polymer, polyoxy methylene, acrylic, fluoropolymer, or polyamide) into which ferromagnetic particles having a Curie temperature higher than the fusion point of the surrounding thermoplastic material are admixed. An example of such a recyclable composite material might be a mixture of polyvinyl chloride, and about 2 percent by weight spinel ferrite particles whose Curie temperature is equal to or greater than the fusion point of the surrounding polyvinyl chloride matrix. As will be described in more detail hereinafter, the presence of the particulate ferromagnetic material in the polyvinyl chloride allows the resulting "tagged" composite material to be magnetically separated from other plastics in which it may be commingled with (say for example, at a solid waste facility), and then melted down for reuse by the application of a beam of microwave energy.

FIG. 4 illustrates an embodiment of the system of the invention which may be advantageously used to create a selectively degradable plastic composite 30. Such a composite 30 may be formed from a polymeric material 5 into which both a particulate ferromagnetic material 7 and particles of a heat actuated degradation chemical 32 have been admixed. The degradation chemical 32 is chosen so that it structurally degrades and destroys the surrounding matrix polymeric material 5 when it is actuated, and the Curie temperature of the particulate ferromagnetic material 7 is chosen to be equal to or greater than the triggering temperature of the heat actuated degradation chemical 32. Such a heat degradable composite 30 may be made from common polyvinyl chloride, into which between 1 and 2 weight percent of spinel ferrite particles had been uniformly dispersed, along with small droplets 32 of an organic peroxide such as benzoyl peroxide. In the preferred embodiment, the benzoyl peroxide should constitute between 1 and 5 weight percent of the polyvinyl chloride material 5, and the Curie temperature of the spinel ferrite admixed into the polyvinyl chloride 5 should be about 100° C. When such a composite 30 is exposed to a dose of microwave energy which creates localized temperatures within the structure of the composite approaching the Curie temperature of the spinel ferrites 7, the benzoyl peroxide droplets 32 will release elemental oxygen, which will oxidize and break the polymeric chains of polyvinyl chloride at numerous situses within the composite 30. In a short time after exposure to such microwave radiation, such a composite 30 will, upon the application of small amounts of mechanical pressure, crumble into numerous small particles suitable for use as a compost.

FIG. 5 illustrates an alternate embodiment of a heat degradable composite 30 formed in accordance with the system and method of the invention. In this embodiment, the benzoyl peroxide 32 and particulate ferromagnetic material 7 are thoroughly admixed together before being introduced into the matrix of polyvinyl chloride. Hence, when the mixture of benzoyl peroxide and particulate ferromagnetic material 7 is uniformly dispersed throughout the polyvinyl chloride 5, almost all of the droplets of benzoyl peroxide contains within it one or more particles of spinel ferrite. This particular embodiment of the method and system of the invention has the advantage of applying the heat generated by the particles of spinel ferrite directly on the interface between the droplets of benzoyl peroxide 32, and the surrounding matrix of polyvinyl chloride 5. Hence, less microwave energy is required to trigger the degradation process in the composite 30 illustrated in FIG. 5.

FIG. 6 illustrates still another embodiment of a heat degradable composite 30, wherein small droplets of benzoyl peroxide 32 and particulate ferromagnetic materials 7 are encapsulated within a thin skin 33 of a plastic material that is relatively immune to degradation from benzoyl peroxide, such as polytetrafluoroethylene. Here, the Curie point of the spinel ferrites captured within the thin encapsulating skin 33 of inert plastic is chosen to be above the boiling point of benzoyl peroxide, which is approximately 105° C., so that when the composite 30 shown in FIG. 6 is exposed to microwave radiation, the benzoyl peroxide partially vaporizes and bursts the thin skin 33 of polytetrafluoroethylene containing it. Once this skin 33 is burst, the oxygen released from the benzoyl peroxide proceeds to destroy the integrity of the surrounding PVC in the same fashion as previously described. While the degradable composite 30 illustrated in FIG. 6 is more difficult to manufacture and requires more microwave energy to degrade, the resulting composite material is also more stable under a broader range of conditions (such as exposure to intense sun light or to incidental heat).

With reference now to FIG. 7, the invention also encompasses a plastic recycling method 35 that utilizes a polymeric composite 3 formed from a thermoplastic polymer material 5 into which particulate ferromagnetic material has been admixed whose Curie temperature is higher than the fusion temperature of the polymeric material 5.

In the initial steps of this recycling method 35, a thermoplastic polymer (such as the aforementioned polyvinyl chloride) is mixed with between 0.5 and 10 percent by weight particles of spinel ferrite to form a tagged polymer composite as is indicated in step 37. At this juncture in the method, the specific microwave absorptive characteristics of the ferrite particles intermixed within the polymer are noted, so that the source of the particular tagged polymer composite might be identified at a later time. After the composite has been formed and the specific characteristics of the ferrite particles within have been recorded for such identification purposes, the composite is then applied to a practical use, such as packaging as is indicated in step 39. Ultimately, as is indicated in step 41, this packaging is discarded as waste which is commingled with other solid waste as is indicated in step 43. The commingled solid waste is then ultimately delivered to a solid waste processing facility (not shown). This method of the invention requires the facility to have a magnetic sorting device comprising a bank of magnets (not shown) which are capable of generating localized magnetic fields which are intense enough to sort the tagged polymer composite away from the other polymers in the commingled solid waste which do not contain any ferrite particles, as is indicated in method step 45. The non-magnetic polymeric materials are then removed from the tagged polymer composite and then either dumped, or incinerated and then dumped at a designated site at the solid waste facility as is indicated by method steps 47–50.

By contrast, the separated, tagged polymer composite is then conveyed to a bank of microwave radiators as indicated by method steps 51 and 53, and then exposed to a sufficient amount of microwave energy to cause the ferrite particles in the composite to heat it to a temperature of over the fusion point of the polymer forming the composite matrix. The melted composite is then recovered for reuse, as is indicated by method steps 53–57.

If tagged polymer composites having higher and lower melting points are commingled along with the solid waste in step 53, and are then sorted out from the non-magnetic waste consistent with method step 45, the composites exposed to the beams of microwave in method step 53 will have different melting points. In such a situation, sufficient microwave heating is applied to first completely melt the lower temperature melting polymer so that this polymer may be collected for reuse (as is indicated in method steps 55 and 57). Subsequently, sufficient microwave energy is applied to the composite having the higher melting point so that this composite may be melted for reuse, as is indicated by method steps 59 and 61. Because different polymers are usually characterized by differing melting points, and because spinel ferrites can be selected so that the Curie points associated with these ferrites are equal to or greater than the melting points of their host polymer materials, microwave heating step 52 may be used to effectively "distill" various melting polymer composites from one another by incrementally scaling up the amount of power radiated by the bank of microwave radiators located in the solid waste facility so that one type of polymeric composite is completely melted away and collected for reuse before the next type of polymeric composite is then melted.

FIG. 8 illustrates a plastic degradation method 65 that is within the scope of the instant invention. In this method, a polymer such as polyvinyl chloride is mixed with not only ferrite particles 7, but one of the previously described heat actuated degradation chemicals 32 to form a tagged polymer composite as is shown in step 37. As was the case with the plastic recycling method 35, the specific characteristics of the spinel ferrites incorporated within the polymer are recorded at this juncture so that the identity of the source of the composite might be known. The resulting heat degradable composite is used, discarded and sorted as is indicated in method steps 39 through 51 in the same fashion as the recyclable plastics discussed with reference to the recycling method 35. Finally, the degradable composite 30 is exposed to microwave radiation from the bank of microwave radiators present in the solid waste facility as is indicated in method step 69 in order to trigger the degradation chemical impregnated within the composite. This in turn destroys the structural integrity of the composite causing it to crumble into a particulate mass which in turn is buried as a compost in method step 71.

We claim:
1. A system for heating a polymeric material to a selected temperature, comprising a particulate ferromagnetic material dispersed throughout said polymeric material to form a composite, wherein said particulate material has a Curie temperature that corresponds to said selected heating temperature, and a source of microwave energy for remotely directing microwaves, to said polymeric composite material to heat at least a portion of said polymeric material throughout its volume to approximately the Curie temperature of the ferromagnetic material, and a heat actuated degradation chemical dispersed throughout said polymeric material, wherein the Curie temperature of the particulate ferromagnetic material is above the temperature required to actuate said degradation chemical such that said composite degrades when exposed to microwave energy.

2. A system as defined in claim 1, wherein said particulate ferromagnetic material comprises between about 0.1% and 10% by weight of the polymeric composite material.

3. A system as defined in claim 2, wherein said particulate ferromagnetic material comprises between about 1% and 5% by weight of the polymeric composite material.

4. A system as defined in claim 1, wherein said ferromagnetic material is a ferrite compound.

5. A system as defined in claim 4, wherein said ferromagnetic material is a spinel ferrite.

6. A system as defined in claim 1, wherein the diameter of the particles of ferromagnetic material range between 10 and 1000 Angstroms.

7. A system as defined in claim 1, wherein the Curie temperature of said particulate ferromagnetic material is between about 50° C. to 700° C.

8. A system as defined in claim 1, wherein said source of microwave energy radiates microwaves having a frequency of between about 400 MHz and 3,000 MHz.

9. A system as defined in claim 1, further comprising a means for directing said microwave energy to a selected portion of said polymeric composite.

10. A system as defined in claim 9, wherein said directing means includes a microwave reflector.

11. A system as defined in claim 1, wherein said particulate ferromagnetic material is distributed within particles of said degradation chemical, and said particles of said degradation chemical is in turn dispersed throughout a matrix of said polymeric material.

12. A system as defined in claim 11, wherein said polymeric material is polyvinyl chloride, and said degradation chemical is benzoyl peroxide, and said Curie temperature of said ferromagnetic particles is 105° C.

13. A system as defined in claim 1, wherein said heat actuated degradation chemical dispersed throughout said polymeric material, is encapsulated in microspheres of a material inert to the degradation action of said chemical, and wherein the Curie temperature of said particulate ferromagnetic material is above the temperature required to cause the walls of said microspheres to open.

14. A system as defined in claim 13, wherein said polymeric material is polyvinyl chloride, and said degradation chemical is benzoyl peroxide, and said Curie temperature of said ferromagnetic particles is 105° C.

15. A system as defined in claim 14, wherein said microspheres are formed from polytetrafluoroethylene which burst when said benzoyl peroxide vaporizes at 105° C. to expose said polyvinyl chloride to oxygen released by the benzoyl peroxide.

16. A system as defined in claim 1, wherein said polymeric material is polyvinyl chloride, and said degradation chemical is an organic peroxide.

17. A system as defined in claim 16, wherein said organic peroxide is benzoyl peroxide.

18. A method for heating a polymeric material to a selected temperature by the application of microwave energy thereto, comprising the steps of:
   (a) selecting a temperature to which to heat the polymeric material;
   (b) selecting a particulate ferromagnetic material whose Curie temperature corresponds to said selected temperature;
   (c) dispersing said particulate ferromagnetic material throughout a matrix of said polymeric material to form a polymeric composite:
   (d) dispersing a heat actuated degradation chemical throughout said polymeric composite, wherein the Curie temperature of the particulate ferromagnetic material is above the temperature required to actuate said degradation chemical, and
   (e) remotely directing microwave energy to said polymeric composite to heat at least a portion of said polymeric material throughout its volume to approximately the Curie temperature of the ferromagnetic material.

19. A method as defined in claim 18, further including the step of encoding the polymeric composite by identifying and recording distinctive electromagnetic characteristics of the ferromagnetic particulate material distributed through the polymeric material when forming the composite.

20. A method for heating a polymeric material to a selected temperature by the application of microwave energy thereto, comprising the steps of:
   (a) selecting a particulate ferromagnetic material whose Curie temperature corresponds to said selected temperature;
   (b) dispersing said particulate ferromagnetic material throughout a matrix of said polymeric material to form a polymeric composite;
   (c) comingling said polymeric composite with other polymeric materials;
   (d) electromagnetically locating said polymeric composite within said comingled polymeric material;
   (e) magnetically separating said polymeric composite from said comingled materials, and
   (f) applying microwave energy to said polymeric composite.

21. A method as defined in claim 20, wherein said polymeric composite has been commingled with other polymeric composites that contain particulate ferromagnetic material having different Curie temperatures, each Curie temperature being lower than the melting point of the polymeric material that it is distributed within.

22. A method as defined in claim 21, further including the step of applying sufficient microwave energy to said commingled polymeric composites so that all of said composites except the composite containing the ferromagnetic material having the highest Curie point are heated to their respective Curie temperatures, and then magnetically separating said composite having the ferromagnetic material with the highest Curie point.

23. A method for recovering and recycling a polymeric composite that has been commingled with other polymeric materials, wherein said composite is formed from a polymeric material, and a particulate ferromagnetic material that has been dispersed throughout said polymeric material whose Curie point is above the melting point of said polymeric material, comprising the steps of
   applying a magnetic field to said commingled polymeric materials to separate said composite from said polymeric materials, and
   applying a beam of microwave energy to said separated composite in order to melt the same for reuse.

24. A method for recovering a selected polymeric composite that has been commingled with a plurality of polymeric composites, each of which is formed from a particulate ferromagnetic material dispersed in a matrix of different polymeric materials having different melting points, wherein the Curie point of the ferromagnetic material of each composite is different, and is above the melting point of the polymeric material that surrounds it, comprising the steps of:
   applying sufficient microwave energy to said commingled composites to heat the composite with the lowest melting point to the Curie point of the ferromagnetic material contained within it to melt said composite, and
   separating said melted composite.

25. A method for separating and degrading a polymeric composite that has been commingled with other polymeric materials, wherein said composite is formed from a polymeric material, a heat actuated degradation chemical dispersed throughout said polymeric material, and a particulate ferromagnetic material having a Curie point that is higher than the actuation temperature of the degradation chemical, comprising the steps of
   applying sufficient microwave energy to said composite to actuate said degradation chemical in order to degrade said composite.

26. A method as defined in claim 25, further comprising the step of magnetically separating said composite from said other polymeric materials.

27. A system for heating a polymeric material to a selected temperature in order to degrade said material, comprising a particulate ferromagnetic material dispersed throughout said polymeric material to form a composite having a Curie temperature, a heat activated degradation chemical dispersed throughout said polymeric material whose temperature of activation is below the Curie temperature of the ferromagnetic material, and a source of microwave energy for applying microwaves to said polymeric composite material.

* * * * *